US009946578B2

(12) United States Patent
Huang et al.

(10) Patent No.: US 9,946,578 B2
(45) Date of Patent: Apr. 17, 2018

(54) MANAGING THE PERSISTENT DATA OF A PRE-INSTALLED APPLICATION IN AN ELASTIC VIRTUAL MACHINE INSTANCE

(71) Applicant: International Business Machines Corporation, Armonk, NY (US)

(72) Inventors: Yun Song Huang, Beijing (CN); Xin Peng Liu, Beijing (CN); Shaw-Ben Shi, Austin, TX (US); Xia Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 13/631,676

(22) Filed: Sep. 28, 2012

(65) Prior Publication Data

US 2013/0086585 A1    Apr. 4, 2013

(30) Foreign Application Priority Data

Sep. 30, 2011    (CN) .......................... 2011 1 0299493

(51) Int. Cl.
*G06F 9/455*    (2006.01)
*G06F 9/50*    (2006.01)
(Continued)

(52) U.S. Cl.
CPC .......... *G06F 9/5072* (2013.01); *G06F 9/5061* (2013.01); *H04L 67/14* (2013.01);
(Continued)

(58) Field of Classification Search
CPC ............... G06F 9/5072; G06F 11/1446; G06F 17/30197; G06F 3/0617; G06F 8/63; G06F 9/45558; G06F 12/00
(Continued)

(56) References Cited

U.S. PATENT DOCUMENTS 7,552,358 B1 *    6/2009    Asgar-Deen et al. ......... 714/6.1
8,468,535 B1 *    6/2013    Keagy et al. ................. 718/104
(Continued)

OTHER PUBLICATIONS

Risbood et al. "High-Level Language for Specifying Configurations of Cloud-Based Deployments". U.S. Appl. No. 61/453,478, filed Mar. 16, 2011. Related to Pub. No. US2012/0240135.*
(Continued)

*Primary Examiner* — Lewis A Bullock, Jr.
*Assistant Examiner* — Gilles Kepnang
(74) *Attorney, Agent, or Firm* — William K. Konrad; Konrad, Raynes, Davda and Victor LLP

(57) ABSTRACT

A method and apparatus for managing the persistent data of a pre-installed application in an elastic virtual machine instance is disclosed, the method comprising: in response to installing an application into a master virtual machine image, obtaining a persistent data point of a function component of the application, the persistent data point comprising a file directory for storing the persistent data of the function component; in response to launching an elastic virtual machine instance from the master virtual machine, creating a storage volume, attaching the storage volume to the elastic virtual machine instance, and mounting the storage volume to the file directory based on the persistent data point. Other features and aspects may be realized, depending upon the particular application.

12 Claims, 10 Drawing Sheets

(51) Int. Cl.
*H04L 29/08* (2006.01)
*G06F 11/14* (2006.01)

(52) U.S. Cl.
CPC ...... *G06F 11/1446* (2013.01); *G06F 11/1458* (2013.01); *G06F 11/1469* (2013.01); *G06F 2009/45562* (2013.01)

(58) Field of Classification Search
USPC ....... 707/827; 714/6.1; 715/739; 718/1, 104; 719/328; 711/162
See application file for complete search history.

(56) References Cited

U.S. PATENT DOCUMENTS

| | | | | |
|---|---|---|---|---|
| 8,676,809 | B1* | 3/2014 | Naftel | G06F 11/1448 707/746 |
| 8,776,053 | B2* | 7/2014 | Lagergren et al. | 718/1 |
| 8,874,888 | B1* | 10/2014 | Beda et al. | 713/2 |
| 8,881,146 | B2* | 11/2014 | Padmanabhuni | G06F 9/45558 711/173 |
| 8,892,833 | B2* | 11/2014 | Smith et al. | 711/162 |
| 9,047,169 | B1* | 6/2015 | Haase | G06F 12/00 |
| 9,569,446 | B1* | 2/2017 | Feathergill | G06F 17/30088 |
| 2003/0149695 | A1* | 8/2003 | Delaire | G06F 17/30197 |
| 2007/0260702 | A1 | 11/2007 | Richardson et al. | |
| 2007/0271428 | A1* | 11/2007 | Atluri | G06F 11/1451 711/162 |
| 2007/0283343 | A1* | 12/2007 | Aridor et al. | 717/174 |
| 2007/0288224 | A1* | 12/2007 | Sundarrajan | G06F 9/5072 703/22 |
| 2008/0034364 | A1* | 2/2008 | Lam | G06F 8/63 718/1 |
| 2008/0270674 | A1 | 10/2008 | Ginzton | |
| 2009/0164994 | A1* | 6/2009 | Vasilevsky et al. | 718/1 |
| 2009/0260007 | A1* | 10/2009 | Beaty et al. | 718/1 |
| 2009/0292737 | A1* | 11/2009 | Hayton | 707/200 |
| 2010/0070725 | A1* | 3/2010 | Prahlad | G06F 11/1453 711/162 |
| 2010/0162239 | A1* | 6/2010 | Wires et al. | 718/1 |
| 2010/0250878 | A1 | 9/2010 | Ichikawa et al. | |
| 2010/0306173 | A1 | 12/2010 | Frank | |
| 2010/0306772 | A1 | 12/2010 | Arnold et al. | |
| 2011/0047548 | A1 | 2/2011 | Traut | |
| 2011/0055714 | A1* | 3/2011 | Vemulapalli et al. | 715/739 |
| 2011/0066819 | A1 | 3/2011 | Mashtizadeh et al. | |
| 2011/0126197 | A1* | 5/2011 | Larsen et al. | 718/1 |
| 2011/0145199 | A1* | 6/2011 | Prasad Palagummi | G06F 11/1469 707/654 |
| 2011/0153697 | A1* | 6/2011 | Nickolov et al. | 707/827 |
| 2012/0110293 | A1* | 5/2012 | Yang | G06F 9/45558 711/170 |
| 2012/0174096 | A1* | 7/2012 | Conover | 718/1 |
| 2012/0240135 | A1* | 9/2012 | Risbood et al. | 719/328 |
| 2012/0254861 | A1* | 10/2012 | Down et al. | 718/1 |
| 2013/0055249 | A1* | 2/2013 | Vaghani | G06F 3/0617 718/1 |
| 2013/0091183 | A1* | 4/2013 | Edwards | G06F 3/0605 707/803 |
| 2013/0104126 | A1* | 4/2013 | Padmanabhuni | G06F 9/45558 718/1 |
| 2013/0227564 | A1* | 8/2013 | Asayama | G06F 9/45558 718/1 |

OTHER PUBLICATIONS

X. Gao et al., "Supporting Cloud Computing With the Virtual Block Store System", (online), Retrieved from the internet at URL: http://grids.ucs.indiana.edu/ptliupages/publications/VBS_v2.pdf, pp. 1-9.
"Intel Cloud Builder Guide to Cloud Design and Deployment on Intel Platforms", Intel Cloud Builder Guide, dated 2010, (online) Retrieved from the Internet at URL: http://software.intel.com/sites/default/files/m/3/7/d/b/1/26674-10TB01_Intel_Cloud_Builder_Guide_to_Cloud_Design.final.pdf, pp. 1-24.
Information Materials for IDS, dated Dec. 24, 2015, Total 4 pages.

* cited by examiner

MANAGING THE PERSISTENT DATA OF A PRE-INSTALLED APPLICATION IN AN ELASTIC VIRTUAL MACHINE INSTANCE

RELATED APPLICATIONS

This application claims priority benefits under Title 35, Unites States Code, Section 119(a)-(d) from China Application No. 201110299493.X, filed Sep. 30, 2011, which is incorporated herein by reference in its entirety.

TECHNICAL FIELD

The present description relates to the field of computer, particularly to cloud computing, and more particularly, to a method and apparatus for managing the persistent data of a pre-installed application in an elastic virtual machine instance.

BACKGROUND

In an Infrastructure as a Service (IaaS) cloud computing service like Amazon EC2 (Elastic Cloud Computing), ISAAC (IBM Service Agility Accelerator for Cloud), RHEV (Red Hat Enterprise Virtualization), etc., elastic virtual machine instances can be provisioned with high scalability. Elastic virtual machine instances are launched from a master virtual machine image in response to users' requests. The master virtual machine image represents a specific configuration of hardware resources such as computing and storage, an operating system platform, and applications etc. All the elastic virtual machine instances launched from a master virtual machine image share common files and data of the master virtual machine image, and a virtual machine instance only stores minimal modified data locally using the Copy-On-Write technique, thus saving the maintenance costs and disk data. In addition, applications can be pre-installed into and configured in the master virtual machine image, so that each user does not have to install and configure applications in his launched virtual machine instance separately, thus saving a lot of time and efforts, lowering the maintenance and storage costs, and shortening the time to value.

However, in such an IaaS solution, all the computing resources are divided into two domains: computing domain and storage domain. The computing domain consists of computing nodes, and provides computing resources (mainly including CPUs, memories and network cards, etc.), however, all the data therein are deemed disposable. The storage domains consist of storage nodes, and provide storage resources for storing data deemed by the user as needing to be retained. An elastic virtual machine instance runs on a computing node, and any data changes stored on the computing node by it using the Copy-On-Write technique is not persistent. If the hardware on which the instance is running fails, or the instance is terminated or shut down, all the newly generated data will be lost. This is because, the elastic virtual machine instance runs on a local temporary image on the computing node based on the master virtual machine image, and the changed data in the temporary image is not stored in the storage domain; while its master virtual machine image does not allow write back, since it is read-only and shared by many users.

Such changed data generated after the virtual machine instance is launched represents the user's actual business data, thus should be stored in the storage volume for the user in the cloud. Currently, cloud service provides some persistent storage solution, namely the storage domain in a cloud environment as described above, so that a user can store any data that he desires to store. For example, Amazon provides the persistent storage using Amazon EBS (Elastic Block Storage), ISAAC provides the Volume solution. A user can create any number of storage volumes that he desires, attach the storage volume to a virtual machine instance as a raw block storage device like an unformatted hard disk, format it using any file system, and mount it to a file directory or logical disk. When the elastic virtual machine instance is terminated, the storage volume remains on the storage node, thus it can be re-attached to a newly launched elastic virtual machine instance. However, such a persistent storage solution is only applicable for the persistent storage of data of an application newly installed and configured after the elastic virtual machine instance has been launched and the storage volume has been created, attached, formatted and mounted, since in the prior art, obviously only after an elastic virtual machine instance has been launched, and a storage has been created, attached, formatted and mounted, can an application be installed and configured so that the data generated during its running can be stored persistently in the volume. While for those applications already pre-installed and pre-configured, the data generated during their running cannot be stored in the volume.

In order to provide persistent storage of user data for a pre-installed and pre-configured software application in a master virtual machine image, presently cloud service providers provides the following three solutions:

1) install and configure all the software applications in one or a set of master virtual machine images; after launching virtual machine instances, for each virtual machine instance, configure the database or file system backup solution as backing up data to a storage volume.

Such a solution can well realize the sharing of pre-installed and pre-configured software applications, thus a virtual machine instance with the configured applications can be launched quickly. However, if a virtual machine instance is terminated, all the data after the last backup operation will be lost. Moreover, such a solution needs to additionally manage a backup solution for each virtual machine instance, even though there is always an overall backup solution for the entire storage provided by cloud service provider to ensure the data security.

2) Launch one virtual machine instance with OS only; create storage volumes and attach them to the instance; then install software applications and configure them to store the persistent data in the storage volumes directly.

This solution actually is used by many users manually, and it is also easy to automate it by IT technology. However it can not provide a virtual machine with installed applications quickly, because it takes a lot of time to install applications, especially some large complex software applications. For example, it will take about 10 hours to finish the installation of IBM Maximo Asset Management application v7.5, and it may take about 80 hours to install a more complex solution. And the application installation can not be shared between different users, and each user needs to install desired applications separately. And for the same user, if the virtual machine instance dies, it is needed to install the application again.

3) Some cloud solution provides a persistent virtual machine instance to resolve this issue. In this case, when a virtual machine instance needs to be launched, a new image(storage volume) is copied from the master virtual machine image on the storage node, and the computing node is connected to the image remotely. The computing node will no longer generate a temporary image using the Copy-On-Write technique. Thus, application data will be stored in the storage volume in the storage domain, therefore when the virtual machine or the host computer is shut down, the application data is still persistent.

This solution needs to copy the whole master virtual machine image, which will take a long time. For example, when copying a master virtual machine image of 100 G, it will take about half an hour. And also because the image in the storage volume is independent of the master image after copying is finished, the system administrator needs extra effort to maintain this image for OS patches, application patches, etc. So if there are 1000 instances, for example, the system administrator' effort will be increased by 1000 times.

Therefore, there is a need in the art for a solution for managing the persistent data of a pre-installed application in a compute cloud elastic virtual machine instance that can overcome the drawbacks described above.

SUMMARY

According to an aspect of the present description, methods, and apparatus perform operations, the operations comprising managing the persistent data of a pre-installed application in an elastic virtual machine instance, comprising: in response to installing an application into a master virtual machine image, obtaining a persistent data point of a function component of the application, the persistent data point comprising a file directory for storing the persistent data of the function component; in response to launching an elastic virtual machine instance from the master virtual machine, creating a storage volume, attaching the storage volume to the elastic virtual machine instance, and mounting the storage volume to the file directory based on the persistent data point.

In another aspect, the operations further comprise, if, after installing the application into the master virtual machine image, the file directory contains initial data of the application, backing up the initial data, and cleaning the file directory; and after mounting the storage volume to the file directory, restoring the backed-up initial data to the file directory.

In still another aspect, the operations further comprise, recording the mapping relationship between the persistent data point and the storage volume; after the elastic virtual machine instance is terminated, in response to launching another elastic virtual machine instance, performing the following operations: attaching the storage volume to the other elastic virtual machine instance; and mounting the storage volume to the file directory based on the recorded mapping relationship between the persistent data point and the storage volume.

In still another aspect, the operations are operations wherein the persistent data point further comprises a reserved storage space size and a file system format, and wherein the creating a storage volume comprises: creating a storage volume of the size of the reserved storage volume size; and formatting the volume into the file system format.

In yet another aspect, the operations are operations wherein the persistent data point further comprises: a command for backing up the initial data; and a command for restoring the initial data.

In still another aspect, the operations are operations wherein the persistent point further comprises an enablement flag for representing whether a respective function component has been enabled, and the creating, attaching and mounting the storage volume is performed in response to determining the enablement flag being true.

In another aspect, the operations further comprise, after the elastic virtual machine instance has been launched, in response to a disabled function component is enabled, based on the persistent data point of the function component, creating a storage volume, attaching the storage volume to the elastic virtual machine instance, and mounting the storage volume to the file directory comprised in the persistent data point.

In still another aspect, the operations further comprise, obtaining a metadata definition of the persistent data point of the function component of the application; and in response to pre-installing the application into the master virtual machine image, instantiating the metadata definition of the persistent data point of the function component of the application based on a user's configurations, thus obtaining the persistent data point of the function component of the application.

In yet another aspect, the operations are implemented in a cloud management system.

Other features and aspects may be realized, depending upon the particular application.

BRIEF DESCRIPTION OF THE DRAWINGS

Novel features believed characteristic of one embodiment of the present description are set forth in the appended claims. An embodiment of the present description itself, however, as well as a preferred mode of use, further features, aspects, objects and advantages thereof, will best be understood by reference to the following detailed description of an illustrative embodiment when read in conjunction with the accompanying drawings, wherein:

DETAILED DESCRIPTION

Figure 1:
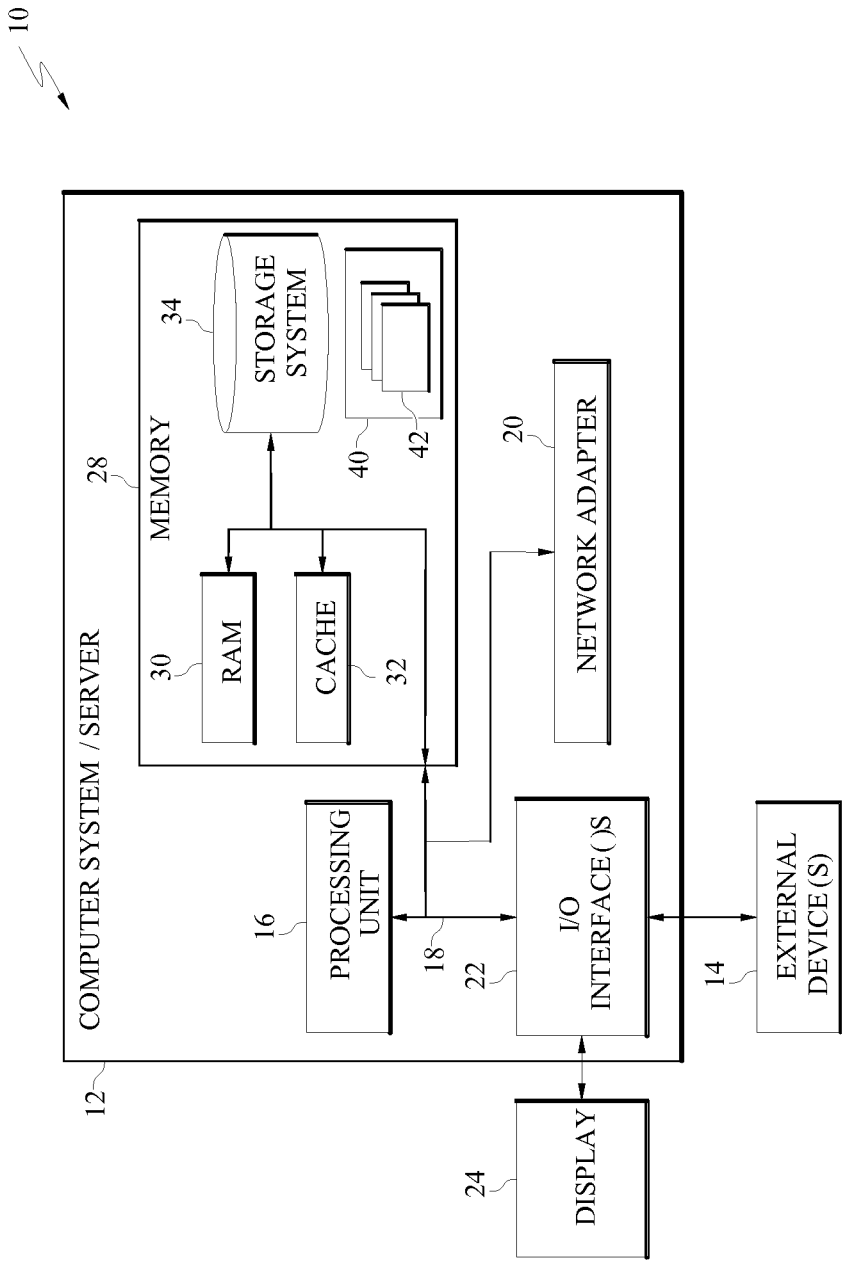
FIG. 1 illustrates a cloud computing node according to an embodiment of the present description.

According to an aspect of the present description, there is provided a method for managing the persistent data of a pre-installed application in an elastic virtual machine instance, comprising: in response to installing the application into a master virtual machine image, obtaining a persistent data point of a function component of the application, the persistent data point comprising a file directory for storing the persistent data of the function component; in response to launching an elastic virtual machine instance from the master virtual machine, creating a storage volume, attaching the storage volume to the elastic virtual machine instance, and mounting the storage volume to the file directory based on the persistent data point.

According to another aspect of the present description, there is provided an apparatus for managing the persistent data of a pre-installed application in an elastic virtual machine instance, comprising: a persistent data point obtaining module configured to, in response to installing an application into a master virtual machine image, obtain a persistent data point of a function component of the application, the persistent data point comprising a file directory for storing the persistent data of the function component; a storage volume manager configured to, in response to launching an elastic virtual machine instance from the master virtual machine, create a storage volume, attach the storage volume to the elastic virtual machine instance, and mount the storage volume to the file directory based on the persistent data point.

Features, aspects and advantages of some embodiments the present description include:

1. The persistent data generated during the running of the elastic virtual machine instance is written to the storage volume directly, so no data is lost when the elastic virtual machine instance is powered off or fails. And no specific data backup solution needs to be maintained for each elastic virtual machine instance. The storage volume backup is taken care of by the overall storage backup solution inside the cloud environment.

2. Applications are pre-installed and pre-configured in the master virtual machine image, so instance users can share the same installation without the time-consuming installation process. And each user has his dedicated storage volume to store his own data.

3. It still belongs to the elastic virtual machine solution, in which it is not needed to copy the whole master virtual machine in order to store the persistent data of the user. And the system administrators only need to maintain the master virtual machine image, thus saving the total cost of ownership.

Other features, aspects or advantages may be realized, depending upon the particular application.

It is understood in advance that although this disclosure includes a detailed description on cloud computing, implementation of the teachings recited herein are not limited to a cloud computing environment. Rather, embodiments of the present description are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the present description described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the present description.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present description as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
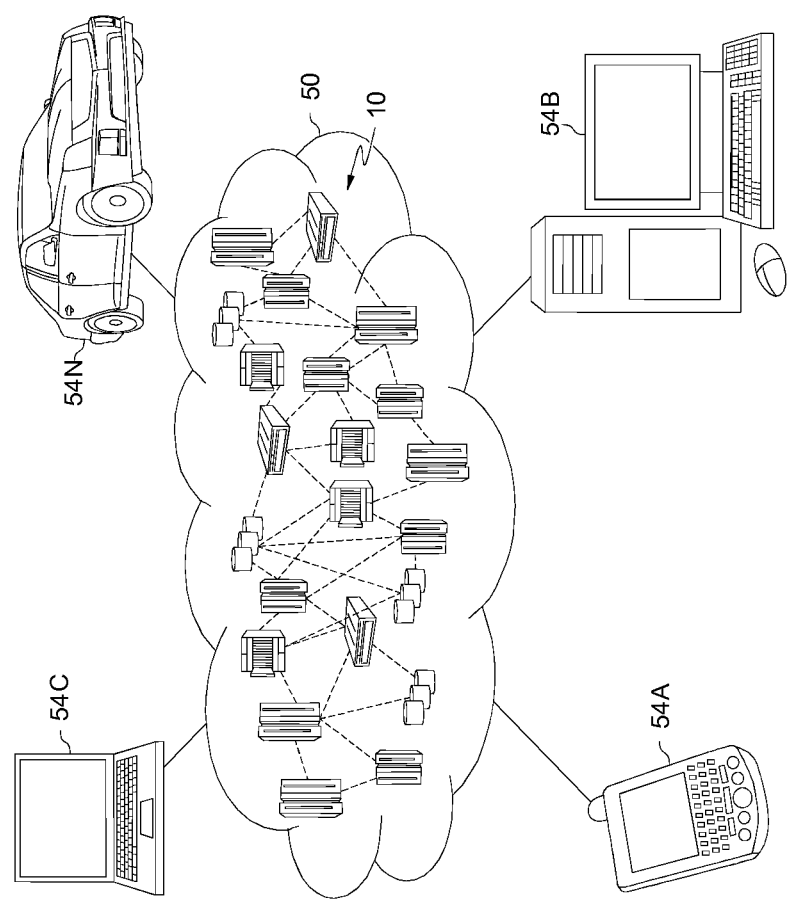
FIG. 2 illustrates a cloud computing environment according to an embodiment of the present description.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
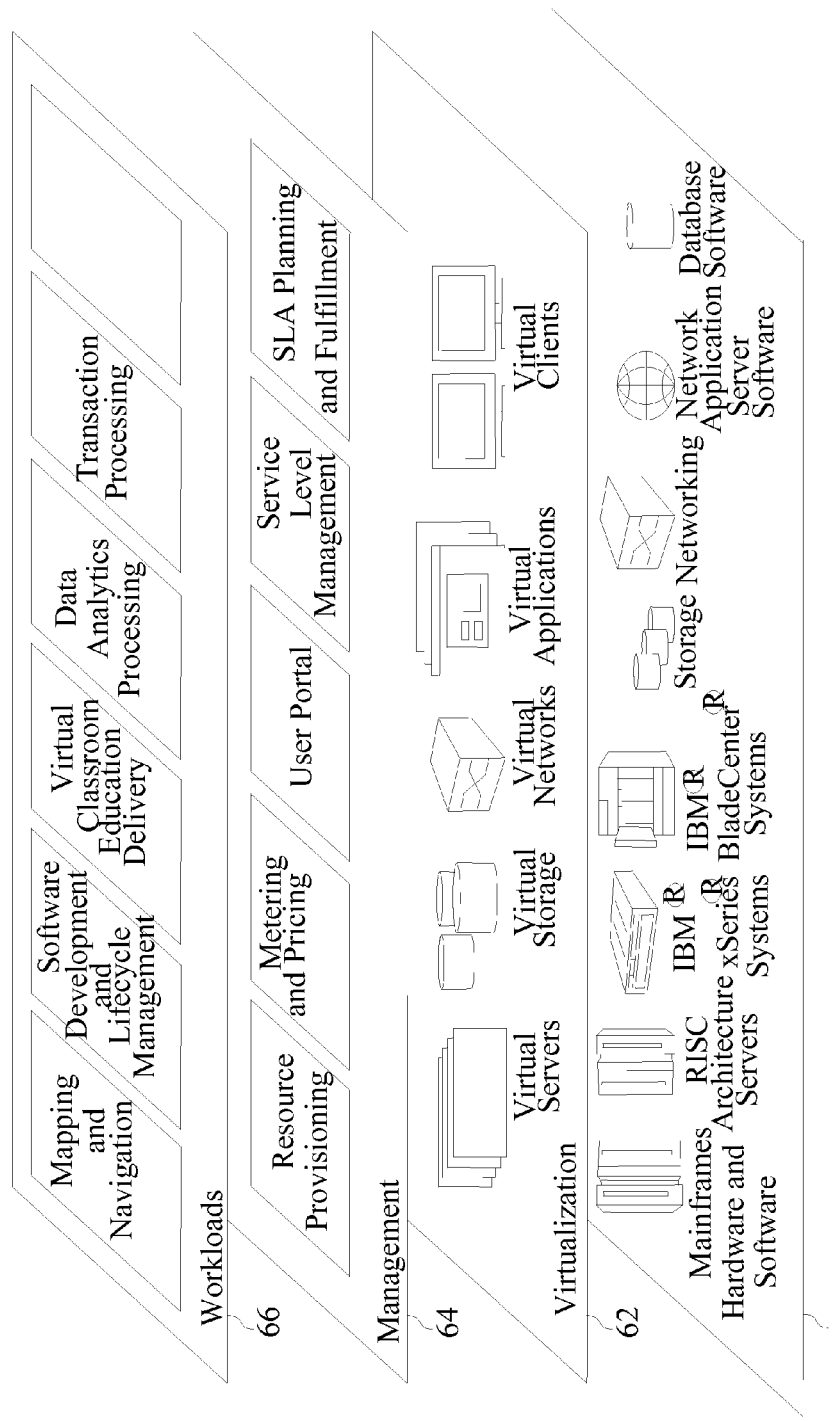
FIG. 3 illustrates abstraction model layers according to an embodiment of the present description.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the present description are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desks, etc.

Figure 4:
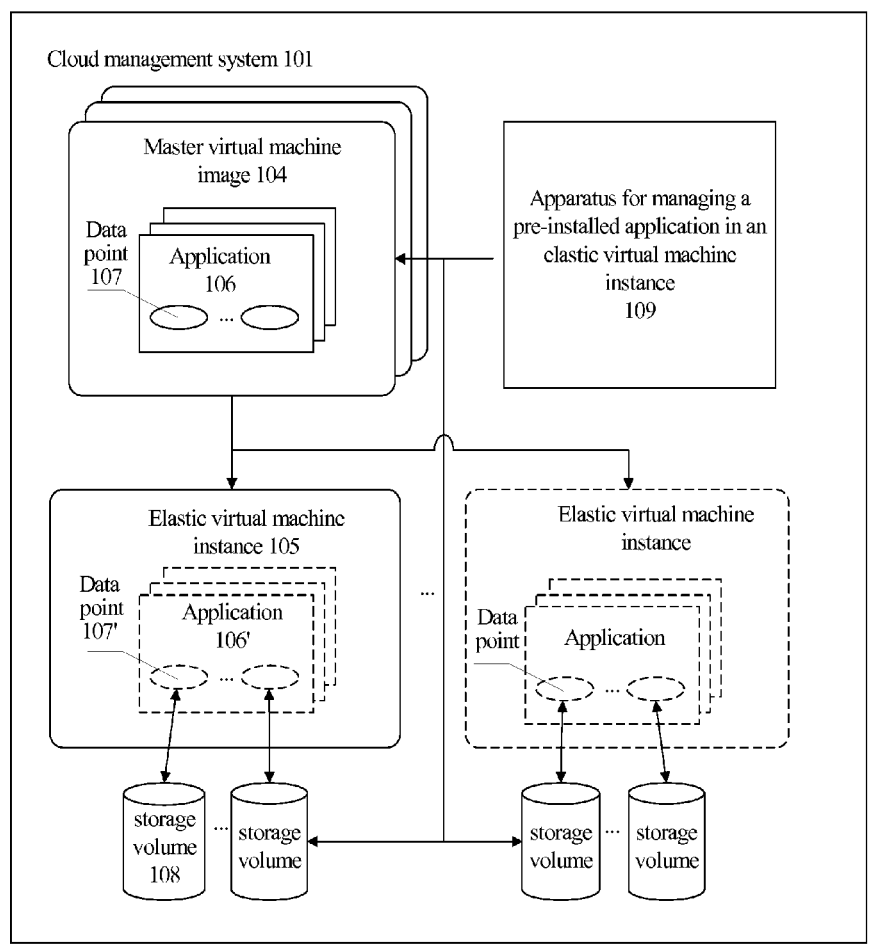
FIG. 4 illustrates a cloud management system in which the present description can be implemented.

FIG. 4 illustrates a cloud management system 101 in which an embodiment of the present description can be implemented. The cloud management system 101 may be an implementation of the management layer 64 shown in FIG. 3. In some embodiments of the present description, the cloud management system 101 is an existing cloud management system, such as Amazon EC2, ISAAC, RHEV solutions, etc. In some other embodiments of the present description, the cloud management system 101 is a cloud management system obtained by adding an apparatus 109 for managing a pre-installed application in an elastic virtual machine instance into an existing cloud management system. As shown, the cloud management system 101 comprises one or more master virtual machine image 104, and one or more elastic virtual machine instances 105 corresponding to respective master virtual machine images. Each master virtual machine image represents a specific configuration of hardware resources of computing and storage, etc. of specific numbers, features and performance, an operating system platform and applications. Based on a master virtual machine image 104, any number of virtual machine instances 105 can be launched, wherein each virtual machine instance 105 will have the same configuration as the master virtual machine image. Thus, a user can specify a specific master virtual machine image in sending a service request to generate a corresponding virtual machine instance 105, thus obtaining an IT infrastructure having a specific hardware and software configuration.

As shown, in an embodiment of the present description, in the master virtual machine image 104 are pre-installed and configured one or more applications 106, each application having one or more persistent data point 107. Accordingly, each elastic virtual machine instance launched from the master virtual machine image will also include the same one or more applications 106', each application 106' having the same one or more data points 107'.

As implied by the broken lines of the blocks of the elastic virtual machine instance 105, application 106' and data points 107', the elastic virtual machine instance 105 and its application 106' have no separate file system independent of the master virtual machine image 104 and its application 106. On the contrary, all the elastic virtual machine instances 105 and their applications 106' of the same master virtual machine image 104 actually share the same file system of the master virtual machine image 104 and its applications 106; however, through the Copy-On-Write technique (not shown) in the cloud management system 101, it appears to each user that he possesses the whole file system in its virtual machine instance exclusively.

A persistent data point of an application represents the storage location of the persistent data of a function component in the application, namely, the file directory in which the persistent data is to be stored. In the present application, a function component refers to a part with a relatively separate function of an application. An application may have one or more function components. A function component may have (or may not have) persistent data that needs to be stored, which is generated during the running of the application, or generated initially during installation of the application. The persistent data of a function component is usually stored at a separate storage location. Of course, the persistent data of a function component may also be stored at multiple storage locations; or the persistent data of multiple function components may be stored at the same storage location. Thus, an application may usually have one or more persistent data points, each persistent data point representing one storage position of a function component in the application. Different applications have different persistent data points based on their designs. Usually, the storage position represented by the persistent data point of an application is specified by default during designing and development of the application, and can be configured by the user during installation of the application.

For those non-persistent data generated during running of application, which needs not be stored persistently, there may be not a corresponding persistent data point.

As shown, according to an embodiment of the present description, the cloud management system 101 further comprises an apparatus 109 (described below) for managing a pre-installed application in an elastic virtual machine instance of an embodiment of the present description, and the apparatus 106 may be implemented in the resource provision function in the management layer 64 shown in FIG. 3. In other embodiments of the present description, the apparatus 109 for managing a pre-installed application in an elastic virtual machine instance of an embodiment of the present description may also reside outside the cloud management system 101.

As shown, according to an embodiment of the present description, for each elastic virtual machine instance 105, the apparatus 109 of the present description may create a storage volume 108 based on each persistent data point 107' of each application 106' included therein, attach the storage volume 108 to the elastic virtual machine instance 105, and mount it to the persistent data point 107'. The storage volume 108 may be any computer readable and writable physical storage medium or part thereof provided or managed by the cloud management system 101.

Solution of an Embodiment of the Present Description

According to an embodiment of the present description, the solution of an embodiment of the present description comprises the following aspects:

(A) Before installing an application into a master virtual machine image, use metadata to define each persistent data point related to a function component of the application.

(B) When installing the application into the master virtual machine image, instantiate each persistent data point metadata of the application.

(C) Back up and clean installation initial data, if any.

(D) After launching an elastic virtual machine instance from the master virtual machine, and before starting applications therein, for each enabled persistent data point, create a storage volume, attach the storage volume to the elastic virtual machine instance, format the storage volume, mount the storage volume to the file directory defined in the persistent data point, and restore the backed-up installation initial data, if any.

(E) When the elastic virtual machine instance fails or is terminated, launch another virtual machine instance from the master virtual machine image, and re-attach the related storage volume to the other virtual machine instance, and re-mount it to the file directory defined in the corresponding data point.

(F) If, after launching a virtual machine instance, an installed but disabled function component of an application is enabled, then create, attach, format and mount a storage volume based on the parameters defined in a related persistent data point.

The aspects of the solution of an embodiment of the present description according to an embodiment of the present description will be described below in detail.

Aspect (A):

Before installing an application in a master virtual machine image, use metadata to define each persistent data point related to a function component of the application, each defined persistent data point may include the following items: the name or identifier of the corresponding function component, storage location, reserved storage space size and file system format, whether including initial data, and initial data backup/restore method, etc., wherein, the name or identifier of the corresponding function component refers to the name or identifier of the function component associated with the data point in the application; the storage location refers to the file directory in which the persistent data of the function component is to be stored; the reserved storage space size refers to the size of the storage volume to be used for storing the persistent data of the function component; the file system format refers to the file system format of the storage volume; whether including initial data refers to whether initial data of the function component will be stored at the storage location during installation of the application; initial data backup/restore method refers to the method for backing up the initial data and for restoring the initial data in the case that the initial data is stored. Using the metadata to define a persistent data point, that is, obtaining the metadata definition of the persistent data point, may mean that the items or some thereof do not include specific values, and only have item names. Specifically, in a data point defined using metadata, it may be that only the item of the name or identifier of the corresponding function component has a specific value, and the items of the storage location, reserved storage space size, file system format, whether including initial data, and initial data backup/restore method do not have specific values, and only have the item names.

The metadata definition of each persistent data point in an application may be obtained from the design and development phases of the application, or obtained by consulting documents about the functions and structure of the application. The obtained metadata definition of the persistent data point of the application may be stored in association with the application, for example at any location accessible to the cloud management system 101.

In other embodiments of the present description, the metadata definition of a persistent data point of an application may include more or less contents, for example including only the storage location, and so forth.

In some other embodiments of the present description, the metadata definition of a persistent data point of an application may not be obtained, rather, a persistent data point of an application or the file directory for storing its persistent data may be obtained directly during installing the application into a master virtual machine image.

Aspect (B):

When installing the application into the master virtual machine image, instantiate each persistent data point metadata of the application. That is, during installing the application into the master virtual machine image, the values of the items in the metadata definition of each persistent data point are filled into the items. The specific values of the items of the storage location, reserved storage space size, file system format, whether including initial data and initial data backup/restore method may be filled into the persistent data point based on the user's configurations during the installation, thus instantiating the persistent data point metadata.

After instantiating all the persistent data point metadata of the application, the instantiated persistent data points of the application may be stored, for example in a persistent data point catalog for the master virtual machine image. The persistent data point catalog for the master virtual machine image may include all the instantiated persistent data points of all the applications pre-installed in the master virtual machine image. The persistent data point catalog may be stored in association with the master virtual machine image at any location accessible to the apparatus 109 of the present description.

In addition, an enablement flag may be set for each persistent data point. The enablement flag is used to indicate whether the function component corresponding with the persistent data point is enabled, and can be set based on the user's configuration during or after the installation.

As described above, in some other embodiments of the present description, the metadata definition of a persistent data point of an application may also not be obtained, thus no need to instantiate a persistent data point of an application, rather, during pre-installing an application into a master virtual machine image, the user may configure or specify the storage location of the persistent data of the application, reserved storage space size for the persistent data, file system format, whether including initial data, initial data backup/restore method, whether the corresponding function component is enabled, etc., and store these in the persistent data point catalog or other data structures of the master virtual machine image, during and/or after the installation.

Aspect (C)

When preparing a master virtual machine image for an elastic compute cloud, if in a persistent data point defined in the persistent data point catalog for the master virtual machine image there is an indication of including initial data (i.e., the item of whether including initial data is true, regardless of whether the enablement flag is true or false), that is, during the installation of the application, at the storage location of the persistent data point is stored the initial data of the corresponding function component, then, the initial data backup/restore method defined in the persistent data point is used to back up the initial data at the storage location, and then the initial data is cleaned from the storage location (so that the empty file directory can be used for subsequently attaching and mounting a storage volume). The above operations can be performed for each persistent data point in the persistent data point catalog for the master virtual machine image.

In some other embodiments of the present description, the persistent data point may not include the item of whether including initial data, rather, any other approaches may be used to indicate (e.g., in any other data structure than the persistent data point and persistent data point catalog associated with the application) whether initial data is stored during the installation of an application; moreover, in the persistent data point may also not include the initial data backup/restore method, rather, for all the data points of an application (or for all the data points of all the applications of a master virtual machine image, or for all the data points of all the applications of all the master virtual machine images in the cloud management system), the same initial data backup/restore method is used.

Of course, in some embodiments of the present description, if it can be determined that no initial data will be stored when installing any application into a master virtual machine image, then, there is no need to back up, clean and restore initial data, and there is no need either to specify in the persistent data point or in other manners whether including initial data and an initial data backup/restore method.

Figure 5:
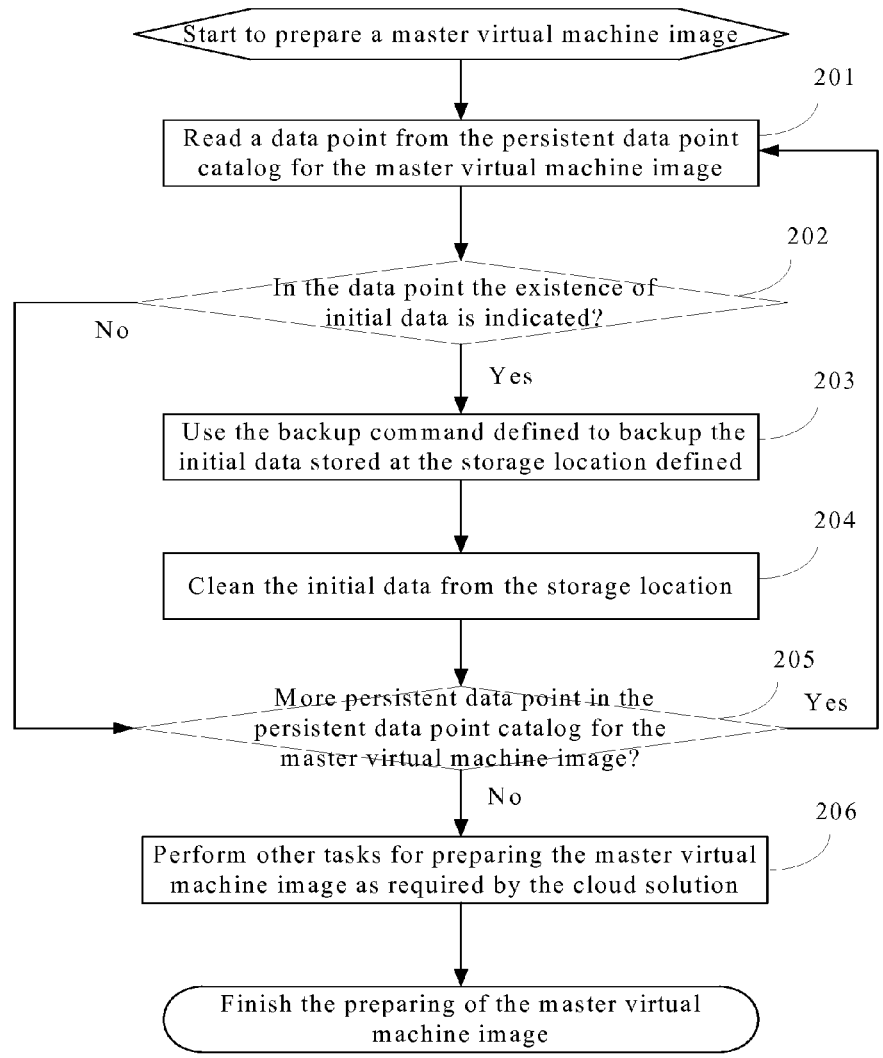
FIG. 5 particularly illustrates a flow of preparing a master virtual machine image according to an embodiment of the present description.

FIG. 5 particularly illustrates a flow of preparing a master virtual machine image according to an embodiment of the present description.

As shown, after starting to prepare the master virtual machine image, in step 210, read a data point from the persistent data point catalog for the master virtual machine image.

In step 202, determine whether in the data point the existence of initial data is indicated. If the determination is No, proceed to step 205. If the determination is Yes, proceed to step 203.

In step 203, use the backup command defined in the data point to back up the initial data stored at the storage location defined in the data point during the installation of the application.

In step 204, clean the initial data from the storage location.

In step 205, determine whether there is more persistent data point in the persistent data point catalog for the master virtual machine image. If the determination in step 205 is Yes, return to step 201 to read next persistent data point from the persistent data point catalog, and perform steps 202-205 again for the next persistent data point. If the determination of step 205 is No, proceed to step 206.

In step 206, perform other tasks for preparing the master virtual machine image as required by the cloud solution (since these tasks are not relevant to some embodiments of the present description, they are omitted here).

Thus, the preparing of the master virtual machine image is finished.

Aspect (D):

After launching an elastic virtual machine instance from the master virtual machine image, and before starting the applications therein, the apparatus 109 according to an embodiment of the present description may read the persistent data point catalog, and for each persistent data point with the enablement flag being true, performing the following operations:

1) create a storage volume of the size of the reserved storage space sized defined in the persistent data point;

2) attach the storage volume to the elastic virtual machine instance;

3) use the file system format defined in the persistent data point to format the storage volume;

4) mount the storage volume to the storage location, namely file directory, defined in the persistent data point;

5) if the value of the item of whether including initial data in the persistent data point is true, use the initial data restore method defined in the persistent data point to restore the backed-up initial data.

The above process can be performed, after an elastic virtual machine instance has been launched, before any application is started, on all the persistent data points of all the applications therein. Alternatively, it can be performed, after an elastic virtual machine instance has been launched, and before any individual application is started, on all the persistent data points of the individual application.

As known in the art, in a current cloud management system 101 are usually provided tools or functions for creating, formatting, attaching and mounting a storage volume, and thus the apparatus of an embodiment of the present description can realize the creating, formatting, attaching and mounting of a storage volume through these tools or functions.

In some other embodiments of the present description, after an elastic virtual machine instance is launched from a master virtual machine image, a persistent data point catalog copy associated with the elastic virtual machine instance may be created from the persistent data point catalog for the master virtual machine image, and may be stored in association with the identifier of the elastic virtual machine instance, for example in a non-volatile storage in the cloud management system 101. Thus, the apparatus 109 of the present description will not read the persistent data point catalog for the master virtual machine image, but read the persistent data point catalog copy for the elastic virtual machine instance, and perform the above operations 1)-5) for each persistent data point therein with the enablement flag being true.

In some other embodiments of the present description, it may also be contemplated for the cloud management system 101 or the apparatus 109 of the present description to create and format in advance storage volumes of different sizes and formats. Thus, it is not needed to create and format a storage volume at this time, and only it is only needed to select an appropriate storage volume based on the reserved storage space size and file system format defined in the persistent data point, and attach the selected storage volume to the elastic virtual machine instance and mount it to the file directory defined in the persistent data point. It may also be contemplated for the apparatus 109 of the present description to use storage volumes of the same size and format for data points, and thus, it is no longer needed to define the reserved storage space size and file system format in the data point, and the apparatus 109 of the present description will attach and mount directly a storage volume of the same size and format created in advance.

In addition, the apparatus 109 of the present description may further store mapping relationship between the persistent data point of the elastic virtual machine instance and the storage volume, for example in a mapping relationship table in a non-volatile storage accessible to the apparatus 109 of the present description in the cloud management system 101, for future use, for example, as described below, when re-launching a new elastic virtual machine instance after this elastic virtual machine instance has been terminated or failed. The apparatus 109 of the present description may store the ID of the elastic virtual machine instance, the name or ID of the persistent data point and the ID of the storage volume in association in the mapping relationship table.

Figure 6:
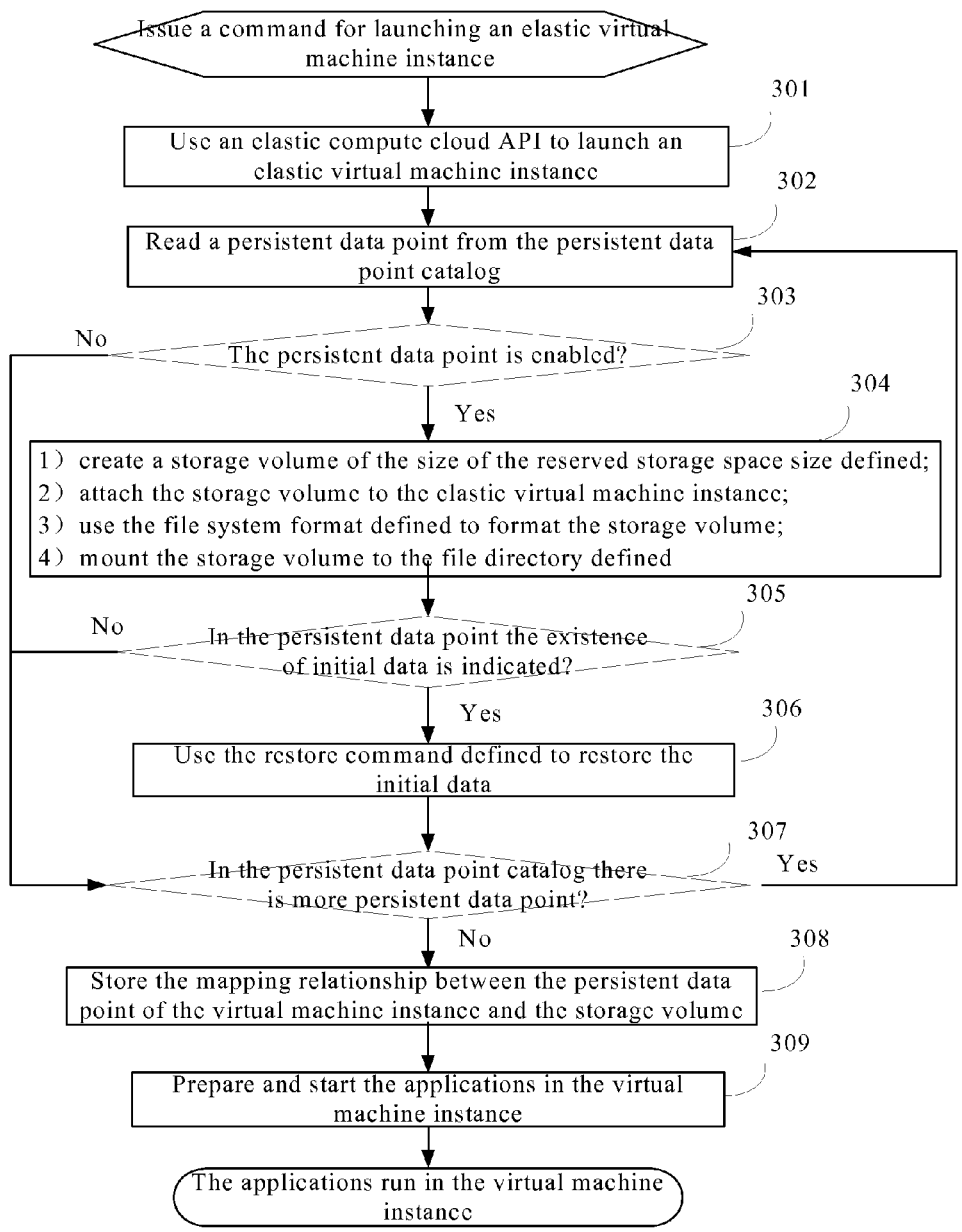
FIG. 6 particularly illustrates a flow of launching an elastic virtual machine instance according to an embodiment of the present description.

FIG. 6 particularly illustrates a flow of launching an elastic virtual machine instance according to an embodiment of the present description.

As shown, after issuing a command for launching an elastic virtual machine instance, in step 301, use an elastic compute cloud API to launch an elastic virtual machine instance. How to use the elastic compute cloud API to launch an elastic virtual machine instance is well known in the art, and will not be described herein.

In step 302, read a persistent data point from the persistent data point catalog for the elastic virtual machine instance. The persistent data point catalog for the elastic virtual machine instance is either the persistent data point catalog for the master virtual machine image, in the case that all the elastic virtual machine instances launched from a master virtual machine image share the persistent data point catalog for the master virtual machine image, or a persistent data point catalog copy for the elastic virtual machine instance, in the case that a persistent data point catalog is generated for each elastic virtual machine instance.

In step 303, determine whether the persistent data point is enabled, namely whether its enablement flag is true. If the determination is No, proceed to step 307. If the determination is Yes, proceed to step 304.

In step 304, perform the following operations: 1) create a storage volume of the size of the reserved storage space size defined in the persistent data point; 2) attach the storage volume to the elastic virtual machine instance; 3) use the file system format defined in the persistent data point to format the storage volume; 4) mount the storage volume to the storage location, i.e. file directory, defined in the data point.

In step 305, determine whether in the persistent data point the existence of initial data is indicated. If the determination is No, proceed to step 307. If the determination is Yes, proceed to step 306.

In step 306, use the restore command defined in the persistent data point (or specified in other manners) to restore the initial data.

In step 307, determine whether in the persistent data point catalog for the elastic virtual machine instance there is more persistent data point. If the determination is Yes, return to step 302 to read a next persistent data point from the persistent data point catalog for the virtual machine instance, and perform steps 303-307 again for the next persistent data point. If the determination is No, proceed to step 308.

In step 308, store the mapping relationship between the persistent data point of the virtual machine instance and the storage volume. For example, the mapping relationship may be stored in a mapping relationship table in a non-volatile storage in the cloud management system 101, for future use.

In step 309, prepare and start the applications in the virtual machine instance, including adapting application configurations to the new network environment, starting the application, etc. Since this step is irrelevant to some embodiments of the present description, it will not be described in detail herein.

Thus, the applications run in the virtual machine instance.

Aspect (E)

During running of the application in the virtual machine instance, the cloud management system 101 will write user persistent data generated by a function component of the application into a corresponding file directory, as specified in the persistent data point corresponding to the function component, thus directly into the mounted storage volume. When the virtual machine instance fails or is terminated, the data in the storage volume will remain.

Thereafter, another virtual machine instance can be launched from the master virtual machine image, and based on the mapping relationship between a persistent data point and a storage volume stored for the virtual machine instance that has failed or been terminated, all the storage volumes of the virtual machine instance that has failed or been terminated may be determined, and may be re-attached to the other virtual machine instance respectively, and re-mounted to the file directory defined in the respective data point respectively, thus realizing the restoration of the virtual machine instance.

Figure 7:
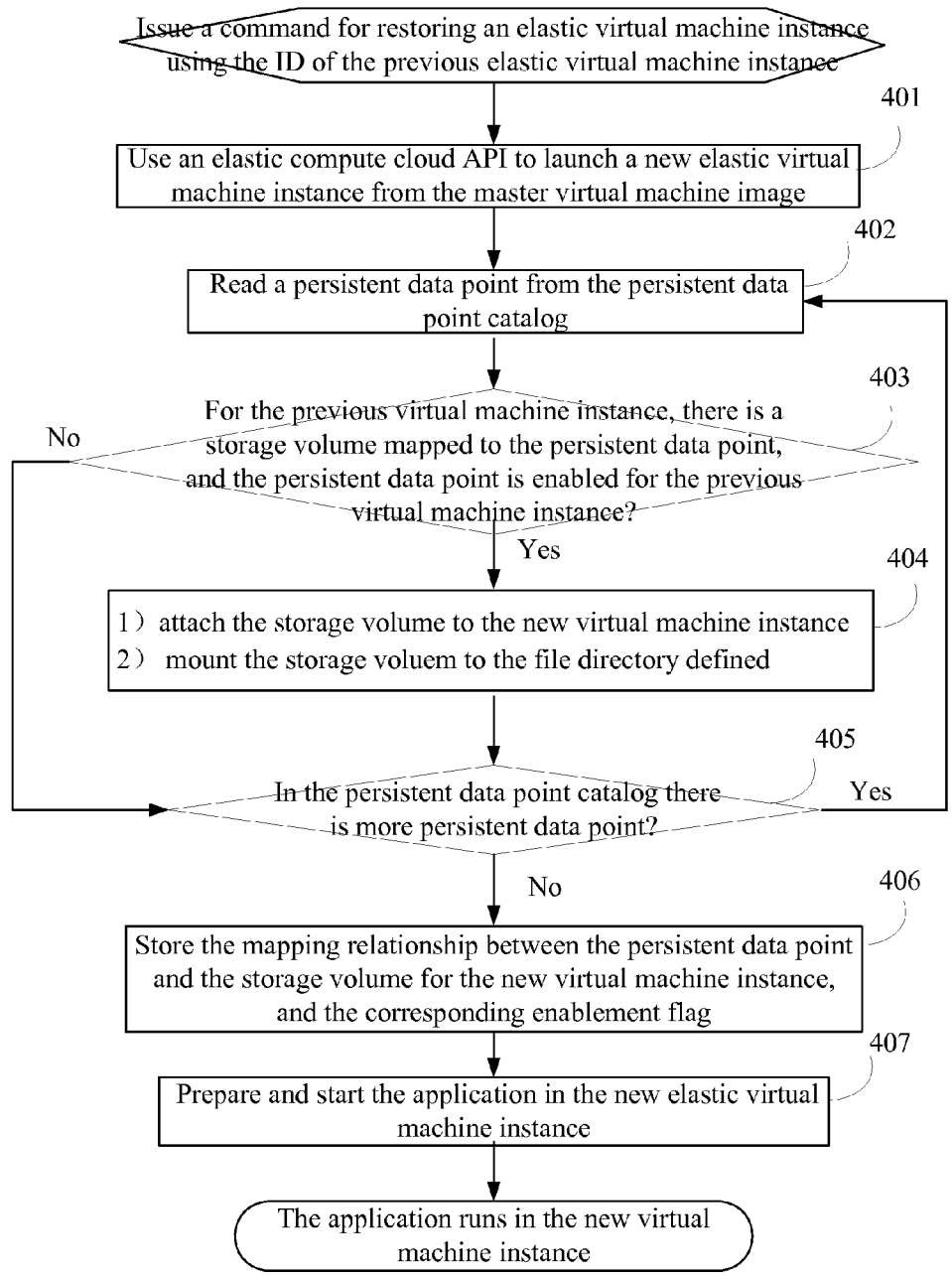
FIG. 7 particularly illustrates a flow of restoring an elastic virtual machine instance according to an embodiment of the present description.

FIG. 7 particularly illustrates a flow of restoring a virtual machine instance according to an embodiment of the present description.

As shown, after issuing a command for restoring an elastic virtual machine instance using the ID of the previous elastic virtual machine instance that has been terminated, in step 401, use an elastic compute cloud API to launch a new elastic virtual machine instance from the master virtual machine image. Moreover, in an embodiment of the present description, when an elastic virtual machine instance is launched from the master virtual machine image, a persistent data point catalog copy for the elastic virtual machine instance may be generated from the persistent data point catalog for the master virtual machine image.

In step 402, read a persistent data point from the persistent data point catalog for the new elastic virtual machine instance, which persistent data point catalog is either the persistent data point catalog for the master virtual machine instance, or the persistent data point catalog copy for the new elastic virtual machine instance.

In step 403, determine, for the previous elastic virtual machine instance, whether there is a storage volume mapped to the persistent data point, and whether the persistent data point is enabled for the previous elastic virtual machine instance.

In an embodiment of the present description, it can be determined, for the previous elastic virtual machine instance, whether there is a storage volume mapped to the persistent data point by querying the mapping relationships between persistent data points of elastic virtual machine instances and storage volumes stored in the mapping relationship table in the above step 308.

In an embodiment of the present description, it can be determined whether the persistent data point is enabled for the previous virtual machine instance by querying the stored value of the enablement flag of the persistent data point in the persistent data point catalog for the previous elastic virtual machine instance (or other flags indicating whether the persistent data point or corresponding function component is enabled in other data structures).

If the determination of step 403 is No, proceed to step 405. If the determination of step 403 is Yes, proceed to step 404.

In step 404, attach the storage volume which is determined to exist in step 403 to the launched new elastic virtual machine instance, and mount it to the file directory defined in the persistent data point.

In step 405, determine whether in the persistent data point catalog for the new elastic virtual machine instance there is more persistent data point. If the determination is Yes, return to step 402 to read a next persistent data point from the persistent data point catalog for the new elastic virtual machine instance, and for the next persistent data point, perform steps 403-405 again. If the determination is No, proceed to step 406.

In step 406, store the mapping relationship between the persistent data point and the storage volume for the new virtual machine instance, and store the corresponding enablement flag of the persistent data point. For example, the mapping relationship is updated to the mapping relationship table described above, to substitute for the mapping relationship between the persistent data point of the previous virtual machine instance and the storage volume, and store the corresponding enablement flag in the persistent data point catalog for the new virtual machine instance or other data structures.

In step 407, prepare and start the application in the new elastic virtual machine instance (adapting the application configurations to the new network environment, starting the application, etc.). Since the contents of the step are irrelevant to some embodiments of the present description, they will not be described herein.

Thus, the application runs in the new virtual machine instance.

Aspect (F)

If, after launching a virtual machine instance, based on topological requirements or user's requirements etc., an installed but disabled function component of an application is enabled, then create, attach, format and mount a storage volume according to the parameters defined in the related persistent data point in the persistent data point catalog. The apparatus 109 of the present description will maintain for the virtual machine instance the value of the enablement flag of the persistent data point related with the function component to be true. The value of the enablement flag will override the default value of the enablement flag of the persistent data point in the persistent data point catalog for the master virtual machine image. In embodiments of the present description in which a persistent data point catalog copy has been generated and maintained for the virtual machine instance, the value of the enablement flag of the persistent data point related with function component in the persistent data point catalog copy can be set true directly. In some other embodiments of the present description, it can be recorded in other data structures maintained for the virtual machine instance that the function component is enabled.

Figure 8:
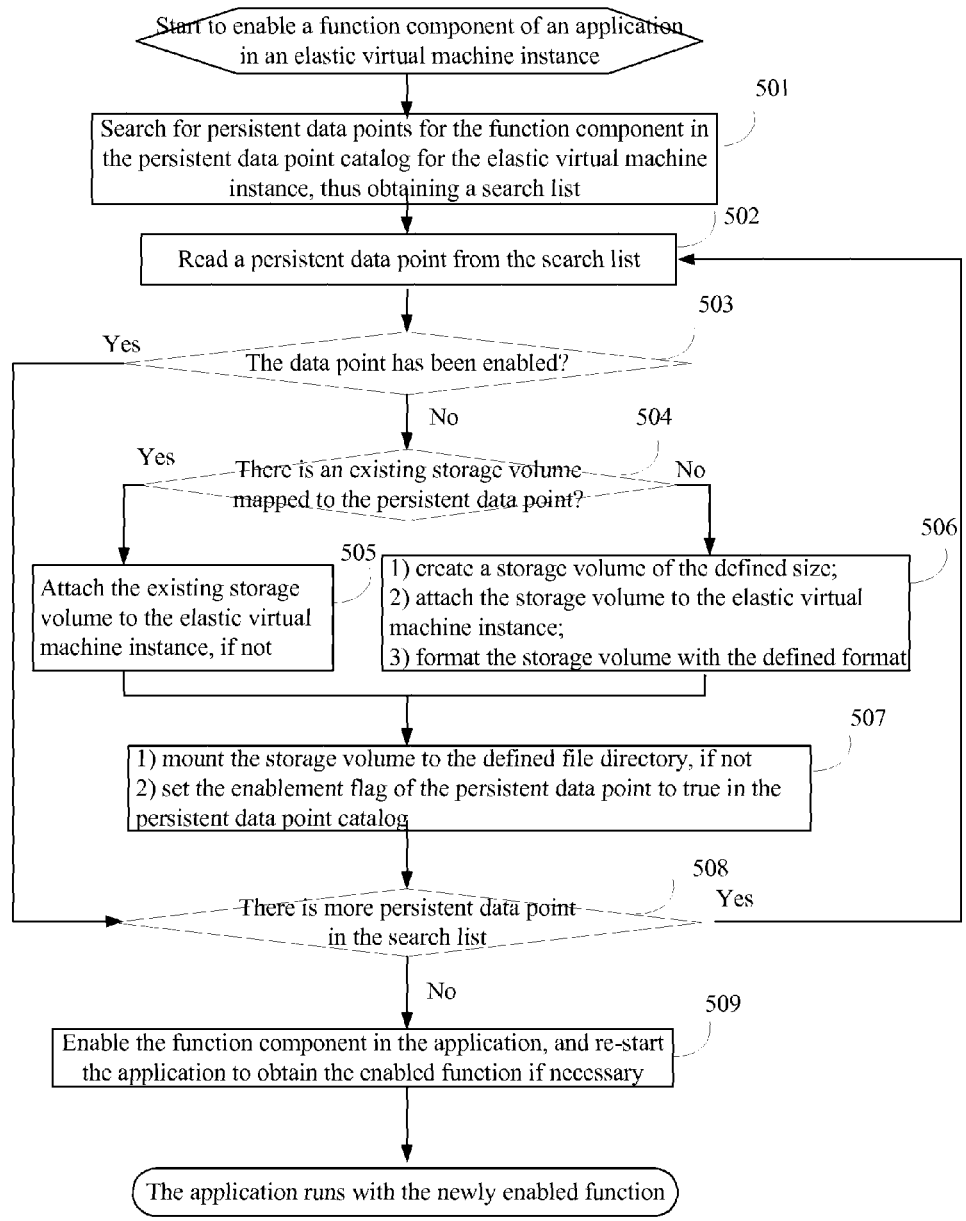
FIG. 8 particularly illustrates a flow of enabling a function component according to an embodiment of the present description.

FIG. 8 particularly illustrates a flow of enabling a function component according to an embodiment of the present description.

As shown, after starting to enable a function component of an application in an elastic virtual machine instance, in step 501, search for persistent data points for the function component in the persistent data point catalog for the elastic virtual machine instance, thus obtaining a search list including all the persistent data points for the function component (a function component may have multiple persistent data storage locations, so it may have multiple persistent data points).

Next, in step 502, read a persistent data point from the search list.

Next, in step 503, determine whether the data point has been enabled (multiple function components may share the same storage location, thus saving the same persistent data points. Therefore, when the function component has not been enabled, its data point may have been enabled due to the enablement of another function component sharing this persistent data point). If the determination is Yes, proceed to step 508. If the determination is No, proceed to step 504. If a persistent data point catalog or another data structure has been created and maintained for the elastic virtual machine instance, it can be recorded in this persistent data point catalog or other data structure whether each data point has been enabled. Thus, it can be determined whether the persistent data point has been enabled by querying the persistent data point catalog or other data structure for the virtual machine instance.

Next, in step 504, determine whether there is an existing storage volume mapped to the persistent data point (if the function component had been enabled and run, but has been terminated due to the virtual machine instance being terminated or other reasons, there may be an existing storage volume mapped to the persistent data point; in addition, if the another function component sharing the persistent data point had run, but has been terminated, there may also be an existing storage volume mapped to the persistent data point). It can be determined whether an existing storage volume mapped to the persistent data point by querying the mapping relationship table stored in step 308. If the determination is Yes, proceed to step 505. If the determination is No, proceed to step 506.

In step 505, attach the existing storage volume to the elastic virtual machine instance, if it has not been attached already (if the function component or another function component sharing the persistent data point had run, but has been terminated, and the virtual machine instance has not been terminated, there may be the existing storage volume already attached to the virtual machine instance). Then, proceed to step 507.

In step 506, create a storage volume of the reserved storage space size defined in the persistent data point, attach the storage volume to the elastic virtual machine instance; and format the storage volume with the file system format defined in the persistent data point. Then, proceed to step 507.

In step 507, mount the storage volume to the storage location, i.e. file directory, defined in the persistent data point, if it has not been mounted already (if the function component or another function component sharing the persistent data point had run, but has been terminated, and the elastic virtual machine instance has not been terminated, an existing storage volume may have been mounted to the file directory already). In addition, set the enablement flag of the persistent data point to true in the persistent data point catalog for the elastic virtual machine instance, or record that the function is enabled in other data structures maintained for the virtual machine instance.

Next, in step 508, determine whether there is more persistent data point in the search list. If the determination is Yes, return to step 502 to perform steps 502-508 for the next persistent data point. If the determination is No, proceed to step 509.

In step 509, enable the function component in the application, and re-start the application if necessary to obtain the enabled function.

Thus, the application runs with the newly enabled function.

In some embodiments of the present description, there may not be the process of, after launching the virtual machine, in response to an installed but disabled function component being enabled, creating, formatting and mounting the storage volume based on the parameters defined in the related persistent data point in the persistent data point catalog.

The present description is applicable to both simple applications such as an Enterprise Asset Management service cloud where a virtual machine contains all the components, and complex solutions.

Exemplary Illustration of a Solution of the Present Description

In the following, the steps of the solution according to a particular embodiment of the present description will be described in detail by taking an Enterprise Asset Management service cloud application:

(A) Before installing an application into a master virtual machine image, use metadata to define each persistent data point related to a function component of the application.

The metadata definitions of the persistent data points of the enterprise assets management service cloud application are presented as follows:

```
<PersistentDataPoints application="Maximo SaaS">
    <PersistentDataPoint name="Maximo Instance Database" hasInitialData="true" enablement="true">
        <FunctionComponent>Base Service</FunctionComponent>
        <Location>%MaximoInstanceDBLocation%</Location>
        <ReservedSize>%ReservedSizeForMaximoInstanceDB%</ReservedSize>
        <FileSystemFormat>%FileSystemFormat%</FileSystemFormat>
        <InitialDataBackupCommand>
            <Command type="cmd">tar czvf %MaximoInstanceDBLocation%.tar.gz %MaximoInstanceDBLocation%</Command>
        </InitialDataBackupCommand>
        <InitialDataRestoreCommand>
            <Command type="cmd">tar xzvf %MaximoInstanceDBLocation%.tar.gz %MaximoInstanceDBLocation%</Command>
        </InitialDataRestoreCommand>
    </PersistentDataPoint>
    <PersistentDataPoint name="Maximo SaaS Usage Data" hasInitialData="false" enablement="true">
        <FunctionComponent>Usage Metering</FunctionComponent>
        <Location>%MaximoUsageDataLocation%</Location>
        <ReservedSize>%ReservedSizeForMaximoUsageData%</ReservedSize>
        <FileSystemFormat>%FileSystemFormat%</FileSystemFormat>
    </PersistentDataPoint>
</PersistentDataPoints>
```

From the above metadata definitions of the persistent data points, it can be known that two persistent data points are defined for the enterprise assets management service cloud application (i.e., Maximo SaaS): Maximo Instance Database for the Base Service function component, and Maximo SaaS Usage Data for the Usage Metering function component. These two data points are both enabled by default. The persistent data point Maximo Instance Database has initial data, and use tar command to back up and restore the initial data. The persistent data point Maximo SaaS Usage Data has no initial data. In the above data point metadata definitions, the parameters defined by %xx% will be substituted with particular values (i.e., instantiation of the data point metadata definitions) during installation of the application, these parameters including the storage location, reserved size, file system format of the data point, which are defined by the elements <Location>, <ReservedSize>, <FileSystemFormat> respectively.

(B) When installing the application into the master virtual machine image, instantiate each persistent data point metadata of the application.

The persistent data point catalog for the master virtual machine image is presented as follows, in which instantiated data point definitions of the Maximo SaaS have been added:

```
<PersistentDataPointsCatalog masterimage="image-MaaSv1.1">
    <PersistentDataPoints application="Maximo SaaS">
        <PersistentDataPoint name="Maximo Instance Database" hasInitialData="true" enablement="true">
            <FunctionComponent>Base Service</FunctionComponent>
            <Location>/home/ctginst1/ctginst1</Location>
            <ReservedSize>10G</ReservedSize>
            <FileSystemFormat>ext3</FileSystemFormat>
            <InitialDataBackupCommand>
                <Command type="cmd">tar czvf /home/ctginst1/ctginst1.tar.gz/home/ctginst1/ctginst1</Command>
            </InitialDataBackupCommand>
            <InitialDataRestoreCommand>
                <Command type="cmd">tar xzvf /home/ctginst1/ctginst1.tar.gz/home/ctginst1/ctginst1</Command>
            </InitialDataRestoreCommand>
        </PersistentDataPoint>
        <PersistentDataPoint name="Maximo SaaS Usage Data" hasInitialData="false" enablement="true">
            <FunctionComponent>Usage Metering</FunctionComponent>
            <Location>/var/IBM/MaaS</Location>
            <ReservedSize>100M</ReservedSize>
            <FileSystemFormat>ext3</FileSystemFormat>
        </PersistentDataPoint>
    </PersistentDataPoints>
    <PersistentDataPoints application="Sample Application">
        <PersistentDataPoint name="Sample Application Persistent Data" hasInitialData="false" enablement="false">
            <FunctionComponent>sample App Component</FunctionComponent>
            <Location>/var/IBM/SampleApp</Location>
            <ReservedSize>1G</ReservedSize>
            <FileSystemFormat>ext3</FileSystemFormat>
        </PersistentDataPoint>
    </PersistentDataPoints>
</PersistentDataPointsCatalog>
```

From the above persistent data point catalog of the master virtual machine image, it can be known that the identifier of the master virtual machine image is image-MaaSv1.1. In addition, from the instantiated persistent data point definitions for the Maximo SaaS application, it can be known that, for the Base Service function component, its persistent data's storage location is /home/ctginst1/ctginst1, the reserved storage space size is 10 G, the file system format of the storage volume is ext3, the backup command of the initial data is tar czvf /home/ctginst1/ctginst1.tar.gz /home/ctginst1/ctginst1, and the restore command of the initial data is tar xzvf /home/ctginst1/ctginst1.tar.gz /home/ctginst1/ctginst1; for the Usage Metering function component, its persistent data storage location is /var/IBM/MaaS, the reserved storage volume size is 100M, the file system format of the storage volume is, and there is no initial data.

If in the master virtual machine image, besides the Maximo SaaS application, there are other applications installed, then the instantiated data point definitions of the other applications will also be added into the persistent data point catalog for the master virtual machine image. For example, in the above persistent data point catalog for the master virtual machine image, besides the instantiated persistent data point definitions for the Maximo SaaS, there are also the instantiated persistent data point definitions for Sample Application. The Sample Application includes a data point named Sample Application Persistent Data, corresponding to the function component named sample App Component which has no stored initial data and is not enabled, and of which the storage location of the persistent data is /var/IBM/SampleApp, the reserved storage volume size is 1 G, the file system format of the storage volume is ext3.

(C) Back up and clean installation initial data, if any.

Taking the above enterprise assets management service cloud application, during the installation of the Maximo SaaS, a lot of data is pre-installed into the Maximo instance database, which data is critical for running of the Maximo instance. Therefore, all the files under the /home/ctginst1/ctginst1 directory (i.e., Maximo instance database files) can be tar-ed and zip-ed into /home/ctginst1/ctginst1.tar.gz, then the files can be deleted so that /home/ctginst1/ctginst1 becomes an empty directory. Since the data file directory (/var/IBV/MaaS directory) used by Maximo SaaS is empty after the installation, there is no need for backing up.

(D) After launching an elastic virtual machine instance from the master virtual machine, and before starting applications therein, for each enabled persistent data point, create a storage volume, attach the storage volume to the elastic virtual machine instance, format the storage volume, mount the storage volume to the file directory defined in the persistent data point, and restore the backed-up installation initial data, if any.

For example, after a Maximo SaaS elastic virtual machine instance has been launched from the master virtual machine image, the apparatus 109 of the present description will iterate through the persistent data points defined in the persistent data point catalog for the master virtual machine image (or the persistent data point catalog copy generated for the Maximo SaaS elastic virtual machine instance when it was launched), and for each enabled (i.e., with the enablement flag being true) persistent data point, perform the following operations: 1) create a storage volume of 10 G for "Maxio Instance Database" and create a storage volume of 100M for "Maximo SaaS Usage Data", 2) attach the two storage volume to the Maximo SaaS virtual machine instance; 3) format the two storage volume as the ext3 format; 4) mount the two storage volume to the storage location defined in the data point : mounting the storage volume of 10 G to /home/ctginst1/ctginst1, and mounting the storage volume of 100M to /var/IBM/MaaS; and 5) if there is initial data, restore the initial data: for the data point "Maximo Instance Database", use the restore command "tar xzvf /home/ctginst1/ctginst1.tar.gz/home/ctginst1/ctginst1" to restore the data of /home/ctginst1/ctginst1. Then, the apparatus 109 of the present description store the mapping relationships between the data points of the elastic virtual machine instance and the storage volumes for the user of the elastic virtual machine instance (InstanceUID:PersistentDataPointName <=> volumeUID), for example in a mapping relationship table in the cloud management system 101. Then, the cloud management system 101 will invoke scripts in the virtual machine to configure the applications for the new environment (new host name, new IP, etc.), and start the applications.

(E) When the elastic virtual machine instance fails or is terminated, launch another virtual machine instance from the master virtual machine image, and re-attach the related storage volume to the other virtual machine instance, and re-mount it to the file directory defined in the corresponding data point.

(F) If, after launching a virtual machine instance, an installed but disabled function component of an application is enabled, then create, attach, format and mount a storage volume based on the parameters defined in a related persistent data point.

Method and Apparatus of the Present Description

While the solution according to specific embodiments of the present description has been described in detail by examples, it should be pointed out that the above description is only an exemplary illustration of the specific embodiments of the present description, intended to enable those skilled in the art to fully and thoroughly understand the principles of the present description, and to realize specific embodiments of the solution of the present description, rather than limitation to the present description. The numerous specific technical features described above are not necessary for the present description, and in some other embodiments of the present description, these technical features may not be included. Actually, as can be understood by those skilled in the art after reading this specification, in the solution of the present description, provided, when pre-installing and configuring an application in a master virtual machine image, obtaining the file directory for storing the persistent data of a function component in the application, and when launching an elastic virtual machine instance from the master virtual machine image, creating a storage volume, attaching the storage volume to the elastic virtual machine instance, and mounting the storage volume to the file directory, this constitutes a complete technical solution, which can solve the technical problem of the present description and produce the corresponding technical effects; while all other specific technical features are not indispensable to the present description.

Further, as can be understood by those skilled in the art through reading the above detailed description of the solution according to embodiments of the present description, an embodiment of the present description actually proposes a method for managing the persistent data of a pre-installed application in an elastic virtual machine instance, and an apparatus for managing the persistent data of a pre-installed application in an elastic virtual machine instance.

Figure 9:
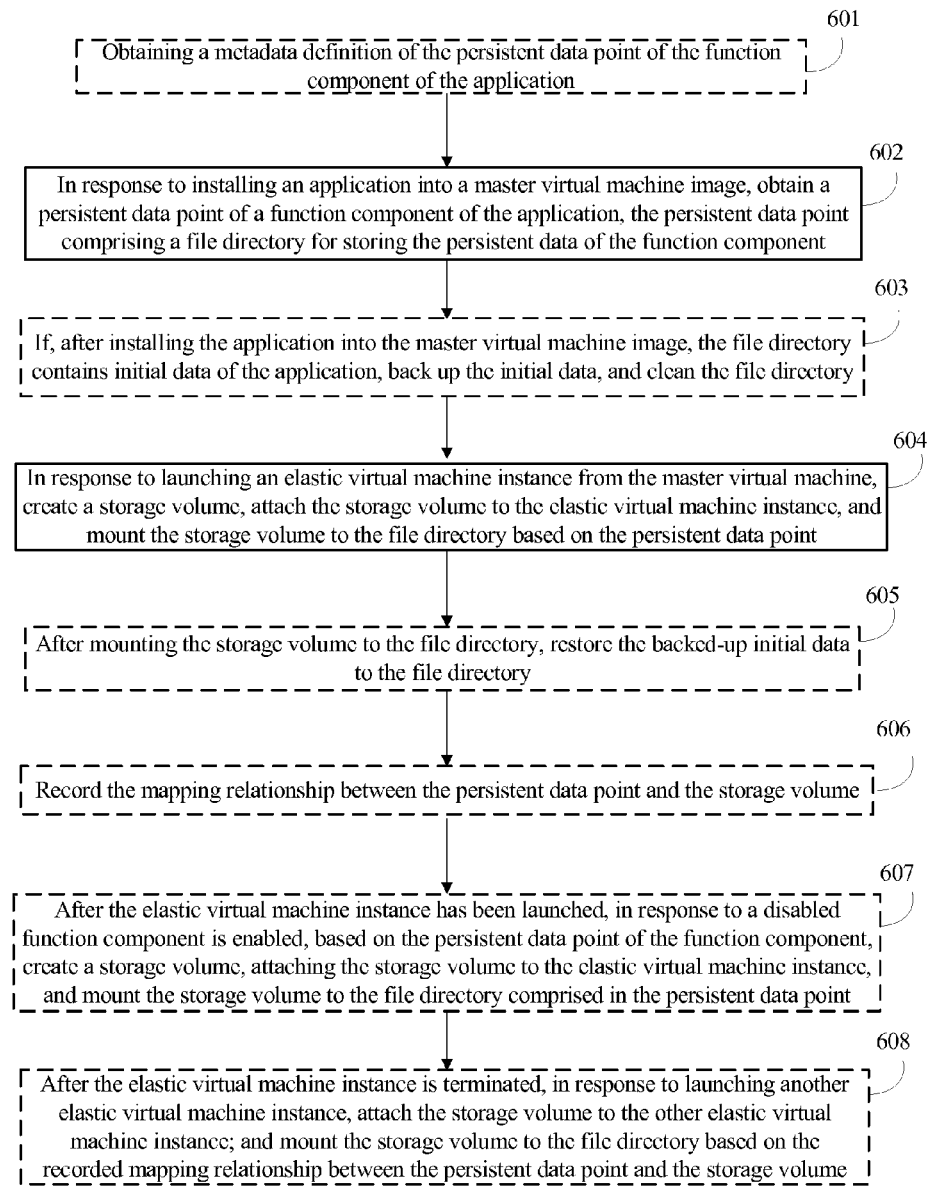
FIG. 9 illustrates a method for managing the persistent data of a pre-installed application in an elastic virtual machine instance.

Referring now to FIG. 9, it illustrates a method for managing the persistent data of a pre-installed application in an elastic virtual machine instance. As shown, the method comprising the following steps:

In step 602, in response to installing an application into a master virtual machine image, obtain a persistent data point of a function component of the application, the persistent data point comprising a file directory for storing the persistent data of the function component.

In step 604, in response to launching an elastic virtual machine instance from the master virtual machine, create a storage volume, attach the storage volume to the elastic virtual machine instance, and mount the storage volume to the file directory based on the persistent data point.

According to an embodiment of the present description, the method further comprises the following optional steps:

In optional step 603, if, after installing the application into the master virtual machine image, the file directory contains initial data of the application, back up the initial data, and clean the file directory.

In optional step 605, after mounting the storage volume to the file directory, restore the backed-up initial data to the file directory.

According to an embodiment of the present description, the method further comprises the following optional steps:

In optional step 606, record the mapping relationship between the persistent data point and the storage volume.

In optional step 608, after the elastic virtual machine instance is terminated, in response to launching another elastic virtual machine instance, perform the following operations:

attaching the storage volume to the other elastic virtual machine instance; and mounting the storage volume to the file directory based on the recorded mapping relationship between the persistent data point and the storage volume.

According to a further embodiment of the present description, the persistent data point further comprises a reserved storage space size and a file system format, and wherein the creating a storage volume comprises:

creating a storage volume of the size of the reserved storage volume size; and formatting the volume into the file system format.

According to a further embodiment of the present description, the persistent data point further comprises:

a command for backing up the initial data; and a command for restoring the initial data.

According to a further embodiment of the present description, the persistent data point further comprises an enablement flag for representing whether a respective function component has been enabled, and the creating, attaching and mounting the storage volume is performed in response to determining the enablement flag being true.

According to a further embodiment of the present description, the method further comprises the following optional step:

In optional step 607, after the elastic virtual machine instance has been launched, in response to a disabled function component is enabled, based on the persistent data point of the function component, create a storage volume, attaching the storage volume to the elastic virtual machine instance, and mount the storage volume to the file directory comprised in the persistent data point.

According to a further embodiment of the present description, the method further comprises the following optional step:

In optional step 601, obtaining a metadata definition of the persistent data point of the function component of the application; and the above step 602 is realized in the following manner:

in response to pre-installing the application into the master virtual machine image, instantiating the metadata definition of the persistent data point of the function component of the application based on a user's configurations, thus obtaining the persistent data point of the function component of the application.

According to an embodiment of the present description, the method is implemented in a cloud management system.

It should be pointed out that, as implied by the broken line of the blocks of steps 601, 603, 605-608, these steps are optional; in some embodiments of the present description, these steps may not be included. In addition, while FIG. 9 illustrates the steps in succession, the order between some steps may be different from that is shown, and they may be performed in parallel or in a reverse order (e.g., between step 605 and 606, etc.)

Figure 10:
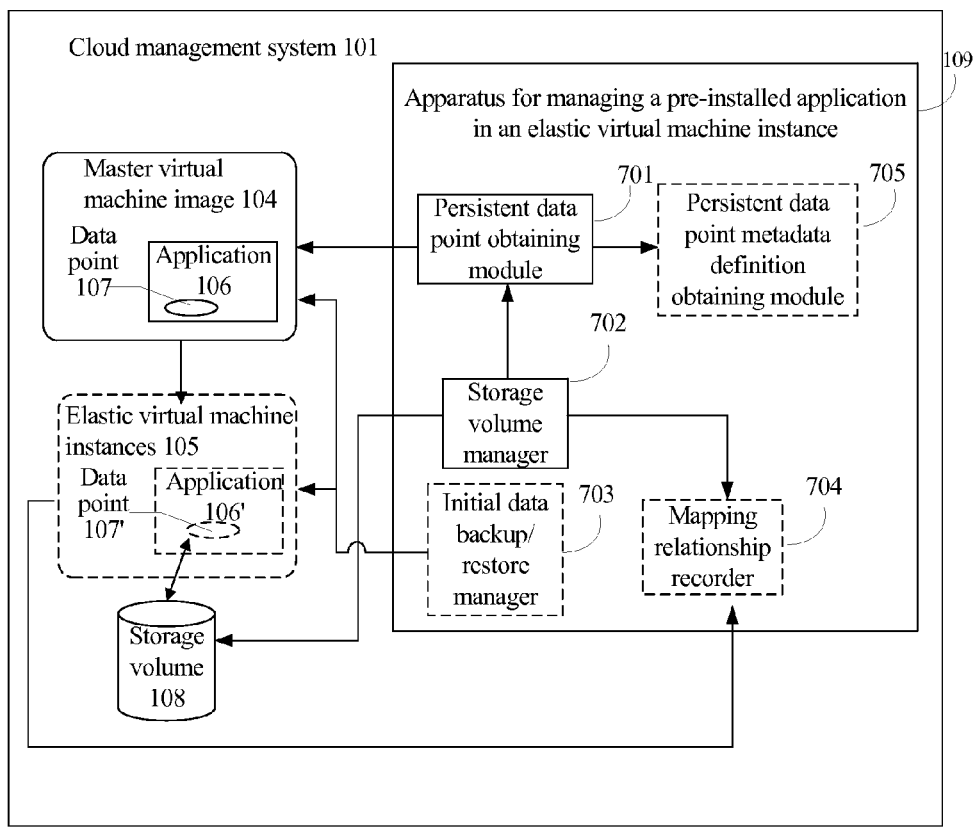
FIG. 10 illustrates an apparatus for managing the persistent data of a pre-installed application in an elastic virtual machine instance.

Referring now to FIG. 10, it illustrates the structure of an apparatus 109 for managing the persistent data of a pre-installed application in an elastic virtual machine instance. As shown, the apparatus 109 runs in the cloud management system 101 (or outside the cloud management system 101), and interacts with master virtual machine image 104, elastic virtual machine instance 105 and other modules shown or not shown in the cloud management system 101. The same components as in FIG. 4 in the cloud management system 101 of FIG. 10 will be omitted from the description below.

As shown, the apparatus 109 comprises the following modules:

a persistent data point obtaining module 701 configured to, in response to installing an application into a master virtual machine image, obtain a persistent data point of a function component of the application, the persistent data point comprising a file directory for storing the persistent data of the function component;

a storage volume manager 702 configured to, in response to launching an elastic virtual machine instance from the master virtual machine, create a storage volume, attach the storage volume to the elastic virtual machine instance, and mount the storage volume to the file directory based on the persistent data point.

According to a further embodiment of the present description, the apparatus 109 further comprises: an optional initial data backup/restore manager 703 configured to:

if, after installing the application into the master virtual machine image, the file directory contains initial data of the application, back up the initial data, and cleaning the file directory; and after mounting the storage volume to the file directory, restore the backed-up initial data to the file directory.

According to a further embodiment of the present description, the apparatus 109 further comprises: an optional mapping relationship recorder 704 configured to record the mapping relationship between the persistent data point and the storage volume, and the storage volume manager 702 is further configured to:

after the elastic virtual machine instance is terminated, launch another elastic virtual machine instance:

attach the storage volume to the other elastic virtual machine instance; and mount the storage volume to the file directory based on the recorded mapping relationship between the persistent data point and the storage volume.

According to a further embodiment of the present description, the persistent data point further comprises a reserved storage space size and a file system format, and the storage volume manager creating a storage volume comprises:

creating a storage volume of the size of the reserved
storage volume size; and
formatting the volume into the file system format.

According to a further embodiment of the present description, the persistent data point further comprises:
a command for backing up the initial data; and
a command for restoring the initial data.

According to a further embodiment of the present description, the persistent point further comprises an enablement flag for representing whether a respective function component has been enabled, and the storage volume manager creating, attaching and mounting the storage volume is performed in response to determining the enablement flag being true.

According to a further embodiment of the present description, the storage volume manager 702 is further configured to: after the elastic virtual machine instance has been launched, in response to a disabled function component is enabled, based on the persistent data point of the function component, create a storage volume, attach the storage volume to the elastic virtual machine instance, and mount the storage volume to the file directory comprised in the persistent data point.

According to a further embodiment of the present description, the apparatus further comprises: a persistent data point metadata definition obtaining module 705 configured to obtain a metadata definition of the persistent data point of the function component of the application; and the persistent data point obtaining module 701 is further configured to: in response to the application being pre-installed into the master virtual machine image, instantiate the metadata definition of the persistent data point of the function component of the application based on a user's configurations, thus obtaining the persistent data point of the function component of the application.

According to a further embodiment of the present description, the apparatus 109 is implemented in a cloud management system.

While the apparatus for managing the persistent data of a pre-installed application in an elastic virtual machine instance is described above with reference to the drawings, it should be pointed out the above description is only an illustration, rather than limitation to the present description. In other embodiments of the present description, the apparatus may have more, less or different modules, and the various relationships such as those of connection, containment, and function among the modules may be different from described.

The present description can be realized in the manner of hardware, software, firmware or any combination thereof. The present description can be realized in a computer system in a centralized manner, or in distributed manner in which, different components are distributed in some inter-connected computer systems. Any computer system or other devices suitable for executing the method described in the present text are suitable. Preferably, the present description is realized in the manner of a combination of computer software and general-purpose computer hardware, in which, the computer program, when being loaded and executed, controls the computer system to make it execute the method of the present description, or form the system of the present description.

The present description also can be embedded in a computer program product, which comprises all the features enabling the implementation of the methods described herein, and which when loaded in a computer system is able to carry out these methods.

While an embodiment of the present description has been particularly shown and described with reference to a preferred embodiment, it will be understood by those skilled in the art that various changes in form and detail may be made therein without departing from the spirit and scope of an embodiment of the present description.

What is claimed is:

1. A method for managing persistent data of a preinstalled application of an elastic virtual machine instance, comprising:
   installing an application into a master virtual machine image, wherein the installing comprises steps of:
   instantiating metadata for a plurality persistent data points associated with the application;
   determining initial data for the persistent data points based on user's configurations;
   storing the determined initial data in a file directory of a respective persistent data point selected from the plurality of persistent data points;
   storing the metadata for the persistent data points within a persistent data point catalog, each of the persistent data points corresponding to a respective function component of the application; and
   associating the persistent data points of the persistent data point catalog to the master virtual machine image, wherein each persistent data point has:
   (i) the file directory for storing persistent data of a respective function component,
   (ii) an enablement flag indicating whether the respective function component has been enabled,
   (iii) a reserved storage space size,
   (iv) a file system format,
   (v) a backup command for backing up initial data, and
   (vi) a restore command for restoring the initial data;
   issuing a command to launch the elastic virtual machine instance from the master virtual machine image:
   based on the issued command, reading a persistent data point from the persistent data point catalog;
   determining whether the file directory, from the persistent data point of the plurality of persistent data points, contains the initial data critical to the persistent data point;
   in response to determining the initial data, backing up the initial data by performing the backup command from the persistent data point and cleaning the file directory;
   subsequent to backing up the initial data, launching an elastic virtual machine instance from the master virtual machine image;
   after launching the elastic virtual machine instance and prior to starting the application:
   determining if the enablement flag from the persistent data point is true; and
   if the enablement flag of the persistent data point is true:
   creating a storage volume of the size of the reserved storage space size associated with the persistent data point;
   formatting the storage volume into the file system format from the persistent data point;
   attaching the storage volume to the launched elastic virtual machine instance; and
   mounting the storage volume to the file directory from the persistent data point;
   restoring the backed-up initial data by performing the restore command from the persistent data point; and
   recording a mapping relationship between the persistent data point and the mounted storage volume; and based on the restored initial data and the recorded mapping relationship, starting the application in the launched elastic virtual machine instance.

2. The method of claim 1, further comprising:
after the elastic virtual machine instance has been launched, in response to a disabled function component being enabled, based on the persistent data point of the function component, creating a new storage volume, attaching the new storage volume to the elastic virtual machine instance, and mounting the new storage volume to the file directory comprised in the persistent data point.

3. The method as recited in claim 1, further comprising:
obtaining a metadata definition of the persistent data point of the function component of the application; and
in response to installing the application into the master virtual machine image, instantiating the metadata definition of the persistent data point of the function component of the application based on the user's configurations, thus obtaining the persistent data point of the function component of the application.

4. The method as recited in claim 1, wherein, the method is implemented in a cloud management system.

5. An apparatus for managing persistent data of a pre-installed application in an elastic virtual machine instance, comprising:
storage configured to store a data structure comprising a persistent data point catalog which includes a plurality of persistent data points associated with a master virtual machine image, wherein the storage further comprises:
determined initial data in a file directory of a respective persistent data point selected from the plurality of persistent data points;
metadata instantiated for the plurality of persistent data points within the persistent data point catalog, and each of the persistent data points corresponding to a respective function component of an application installed on the master virtual image;
a persistent data point obtaining module configured to obtain from the persistent data point catalog, the persistent data point of the respective function component the application, wherein each persistent data point has:
(i) the file directory for storing persistent data of a respective function component,
(ii) an enablement flag indicating whether the respective function component has been enabled,
(iii) a reserved storage space size,
(iv) a file system format,
(v) a backup command for backing up initial data, and
(vi) a restore command for restoring the initial data;
a storage volume manager configured to:
issue a command to launch the elastic virtual machine instance from the master virtual machine image;
based on the issued command, read a persistent data point from the persistent data point catalog;
determine whether the file directory from the persistent data point of the plurality of persistent data points, contains the initial data critical to the persistent data point;
in response to determining the initial data, back up the initial data by performing the backup command from the persistent data point and cleaning the file directory;
subsequent to backing up the initial data, launch an elastic virtual machine instance from the master virtual machine image; and after launching the elastic virtual machine instance and prior to starting the application:
determine if the enablement flag from the persistent data point is true; and
if the enablement flag of the persistent data point is true:
create a storage volume of the size of the reserved storage space size associated with the persistent data point;
format the storage volume into the file system format from the persistent data point;
attach the storage volume to the launched elastic virtual machine instance; and
mount the storage volume to the file directory from the persistent data point;
an initial data backup/restore manager configured to:
after launching the elastic virtual machine instance and prior to starting the application:
restore the backed-up initial data by performing the restore command from the persistent data point;
a mapping relationship recorder configured to:
after launching the elastic virtual machine instance and prior to starting the application:
record the mapping relationship between the persistent data point and the storage volume; and
a cloud management system configured to:
based on the restored initial data and the recorded mapping relationship, start the application in the launched elastic virtual machine instance.

6. The apparatus of claim 5, wherein the storage volume manager is further configured to:
after the elastic virtual machine instance has been launched, in response to a disabled function component being enabled, based on the persistent data point of the function component, create a new storage volume, attach the new storage volume to the elastic virtual machine instance, and mount the new storage volume to the file directory comprised in the persistent data point.

7. The apparatus as recited in claim 5, further comprising:
a persistent data point metadata definition obtaining module configured to obtain a metadata definition of the persistent data point of the function component of the application; and
wherein, the persistent data point obtaining module is further configured to:
in response to the application being installed into the master virtual machine image, instantiate the metadata definition of the persistent data point of the function component of the application based on the user's configurations, thus obtaining the persistent data point of the function component of the application.

8. The apparatus as recited in claim 5, wherein, the apparatus is implemented in the cloud management system.

9. A computer program product for managing persistent data of a pre-installed application in an elastic virtual machine instance, the computer program product comprising a non-transitory computer readable storage medium having computer readable program modules embodied therein for execution by a processor to perform operations, the operations comprising:
installing an application into a master virtual machine image, wherein the installing comprises steps of:
instantiating metadata for a plurality of persistent data points associated with the application;

determining initial data for the persistent data points based on user's configurations;

storing the determined initial data in a file directory of a respective persistent data point selected from the plurality of persistent data points;

storing the metadata for the persistent data points within a persistent data point catalog, each of the persistent data points corresponding to a respective function component of the application; and associating the persistent data points of the persistent data point catalog to the master virtual machine image, wherein each persistent data point has:
 (i) the file directory for storing persistent data of a respective function component,
 (ii) an enablement flag indicating whether the respective function component has been enabled,
 (iii) a reserved storage space size,
 (iv) a file system format,
 (v) a backup command for backing up initial data, and
 (vi) a restore command for restoring the initial data;

issuing a command to launch the elastic virtual machine instance from the master virtual machine image;

based on the issued command, reading a persistent data point from the persistent data point catalog;

determining whether the file directory, from the persistent data point of the plurality of persistent data points, contains the initial data critical to the persistent data point;

in response to determining the initial data, backing up the initial data by performing the backup command from the persistent data point and cleaning the file directory;

subsequent to backing up the initial data, launching an elastic virtual machine instance from the master virtual machine image;

after launching the elastic virtual machine instance and prior to starting the application:
 determining if the enablement flag from the persistent data point is true;
 if the enablement flag of the persistent data point is true:
  creating a storage volume of the size of the reserved storage space size associated with the persistent data point;
  formatting the storage volume into the file system format from the persistent data point;
  attaching the storage volume to the launched. elastic virtual machine instance; and
  mounting the storage volume to the file directory based on the persistent data point;
 restoring the backed-up initial data by performing the restore command from the persistent data point; and
 recording a mapping relationship between the persistent data point and the mounted storage volume; and
based on the restored initial data and the recorded mapping relationship, starting the application in the launched elastic virtual machine instance.

10. The computer program product of claim 9, wherein the operations further comprise:
after the elastic virtual machine instance has been launched, in response to a disabled function component being enabled, based on the persistent data point the function component, creating a new storage volume, attaching the new storage volume to the elastic virtual machine instance, and mounting the new storage volume to the file directory comprised in the persistent data point.

11. The computer program product as recited in claim 9, wherein the operations further comprise:
obtaining a metadata definition of the persistent data point of the function component of the application; and
in response to installing the application into the master virtual machine image, instantiating the metadata definition of the persistent data point of the function component of the application based on the user's configurations, thus obtaining the persistent data point of the function component of the application.

12. The computer program product as recited in claim 9, wherein, the computer program product is implemented in a cloud management system.

\* \* \* \* \*